United States Patent
Reims et al.

(10) Patent No.: US 11,775,791 B2
(45) Date of Patent: Oct. 3, 2023

(54) CLOUD-BASED PARALLEL INK ESTIMATION FOR PRODUCTION PRINTERS

(71) Applicants: Colin Reims, Boulder, CO (US); Marquis G. Waller, Beverly, OH (US); Kenneth Stuart Shouldice, Firestone, CO (US); Kelly Harr, Boulder, CO (US); John Barker Condon, Corvallis, OR (US)

(72) Inventors: Colin Reims, Boulder, CO (US); Marquis G. Waller, Beverly, OH (US); Kenneth Stuart Shouldice, Firestone, CO (US); Kelly Harr, Boulder, CO (US); John Barker Condon, Corvallis, OR (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/684,638

(22) Filed: Mar. 2, 2022

(65) Prior Publication Data
US 2023/0281410 A1     Sep. 7, 2023

(51) Int. Cl.
G06F 3/12       (2006.01)
G06K 15/02      (2006.01)
G06F 9/455      (2018.01)

(52) U.S. Cl.
CPC ....... *G06K 15/1823* (2013.01); *G06F 3/1203* (2013.01); *G06F 3/1229* (2013.01); *G06F 3/1287* (2013.01); *G06F 9/45533* (2013.01)

(58) Field of Classification Search
None
See application file for complete search history.

(56) References Cited

U.S. PATENT DOCUMENTS 8,047,626 B1 * 11/2011 Derhak .............. G06Q 30/0283
                                              358/1.15
10,983,967 B2   4/2021 Tsirogiannis et al.
(Continued)

FOREIGN PATENT DOCUMENTS

CN    112078246 A   12/2020
EP    3531267 A1    8/2019
(Continued)

OTHER PUBLICATIONS

Adding classifiers to a Crawler; https://docs.aws.amazon.com/glue/latest/dg/add-classifier.html.
Alger; How To Convert CSV Objects to Parquet in Cloud Object Storage; https://www.ibm.com/cloud/blog/hou-to-convert-csv-objects-to-parquet-in-cloud-object-storage.
(Continued)

*Primary Examiner* — Henok Shiferaw
(74) *Attorney, Agent, or Firm* — Duft & Bornsen, PC

(57) ABSTRACT

Systems and methods are provided for ink estimation. One embodiment is a system for dynamic ink use estimation. The system includes a cloud computing system. The cloud computing system includes a cloud event service able to receive a print job and potential configurations of a printer selected for printing the print job, and to initialize virtual printers for the printer that each correspond with one of the potential configurations. The cloud computing system also includes the virtual printers, which are able to operate in parallel to estimate amounts of ink used for each configuration during printing of the print job, and to store the estimated amounts of ink in a cloud storage.

20 Claims, 11 Drawing Sheets

(56) References Cited

U.S. PATENT DOCUMENTS

| | | |
|---|---|---|
| 11,138,220 B2 | 10/2021 | Shah et al. |
| 2002/0124752 A1 | 9/2002 | Mayer et al. |
| 2012/0212771 A1* | 8/2012 | Goddard ............... G06F 3/1255 |
| | | 358/1.15 |
| 2016/0259601 A1* | 9/2016 | Dalaa .................... G06F 3/1288 |
| 2018/0113655 A1 | 4/2018 | Sawata et al. |
| 2018/0253477 A1 | 9/2018 | Schoueri et al. |
| 2019/0268482 A1* | 8/2019 | Stanich ............. H04N 1/00005 |
| 2020/0242135 A1 | 7/2020 | Shah et al. |
| 2020/0259964 A1* | 8/2020 | Mizuta ................... G06N 3/084 |
| 2020/0334247 A1 | 10/2020 | Komacker et al. |
| 2020/0377233 A1 | 12/2020 | Harvey et al. |
| 2021/0117417 A1 | 4/2021 | Hendrickson et al. |
| 2021/0271943 A1* | 9/2021 | Stanich ................ G06K 15/027 |
| 2022/0137903 A1* | 5/2022 | Morales ................ G06F 3/1219 |
| | | 358/1.2 |
| 2022/0357906 A1* | 11/2022 | Kimura ................... G06F 3/126 |
| 2022/0383058 A1* | 12/2022 | Shaw ................... H04N 1/6022 |

FOREIGN PATENT DOCUMENTS

| | | |
|---|---|---|
| JP | 6008115 B2 | 10/2016 |
| JP | 2021008108 A | 1/2021 |

OTHER PUBLICATIONS

Classifier—AWS Glue; https://docs.aws.amazon.com/glue/latest/webapi/API_clissifier.html.

How to Convert the CSV file to the Avro Parquet and JSON files in Apache sparkhttps://www.projectpro.io/recipes/convert-csv-file-avro-parquet-and-json-files-apache-spark.

Import from CSV Options; https://www.ibm.com/docs/en/iis/9.1.

Preetdeep Kumar; How to Transform CSV to Parquet using AWS Glue; https://techwithcloud.com/2021/03/21/csv-to-parquet-using-aws-glue/.

Understanding the Data Format for Amazon ML; https://docs.aws.amazon.com/machine-learning/latest/dg/understaing-the-data-format-for-amazon-ml.html.

* cited by examiner

US 11,775,791 B2

CLOUD-BASED PARALLEL INK ESTIMATION FOR PRODUCTION PRINTERS

TECHNICAL FIELD

The following disclosure relates to the field of printing, and in particular, to estimating the ink usage of a printer for a specific print job.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

Ink is responsible for a substantial material cost associated with printing. However, an amount of ink used by a production printer varies from print job to print job, from printer model to printer model, and from printer to printer. Thus, it remains difficult to estimate the total cost of printing a print job as an a priori process.

Print shop operators continue to seek certainty and a precise understanding of the amount of ink that will be used by a print shop during the printing of any given job. This helps to ensure that the cost of printing each job is known before physical resources at the print shop are used for printing.

SUMMARY

Embodiments described herein provide for cloud-based virtual printers that simulate configurations for a specific printer at a print shop. These virtual printers provide accurate estimation of ink usage for the printer because they actively simulate potential hardware and/or software configurations of that printer. Specifically, the virtual printers each generate a different estimate of ink usage by simulating a different configuration of the printer. In this manner, a print shop operator is capable of rapidly identifying an ideal printer configuration for a print job that balances quality with ink usage.

One embodiment is a system for dynamic ink use estimation. The system includes a cloud computing system. The cloud computing system includes a cloud event service able to receive a print job and potential configurations of a printer selected for printing the print job, and to initialize virtual printers for the printer that each correspond with one of the potential configurations. The cloud computing system also includes the virtual printers, which are able to operate in parallel to estimate amounts of ink used for each configuration during printing of the print job, and to store the estimated amounts of ink in a cloud storage.

A further embodiment is a non-transitory computer readable medium embodying programmed instructions which, when executed by a processor, are operable for performing actions including receiving, at a cloud event service, a print job and potential configurations of a printer selected for printing the print job, initializing, via the cloud event service, virtual printers for the printer that each correspond with one of the potential configurations, operating the virtual printers in parallel to estimate amounts of ink used for each configuration during printing of the print job, and storing the estimated amounts of ink in a cloud storage.

A further embodiment is a method dynamic ink use estimation. The method includes receiving, at a cloud event service, a print job and potential configurations of a printer selected for printing the print job, initializing, via the cloud event service, virtual printers for the printer that each correspond with one of the potential configurations, operating the virtual printers in parallel to estimate amounts of ink used for each configuration during printing of the print job, and storing the estimated amounts of ink in a cloud storage.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
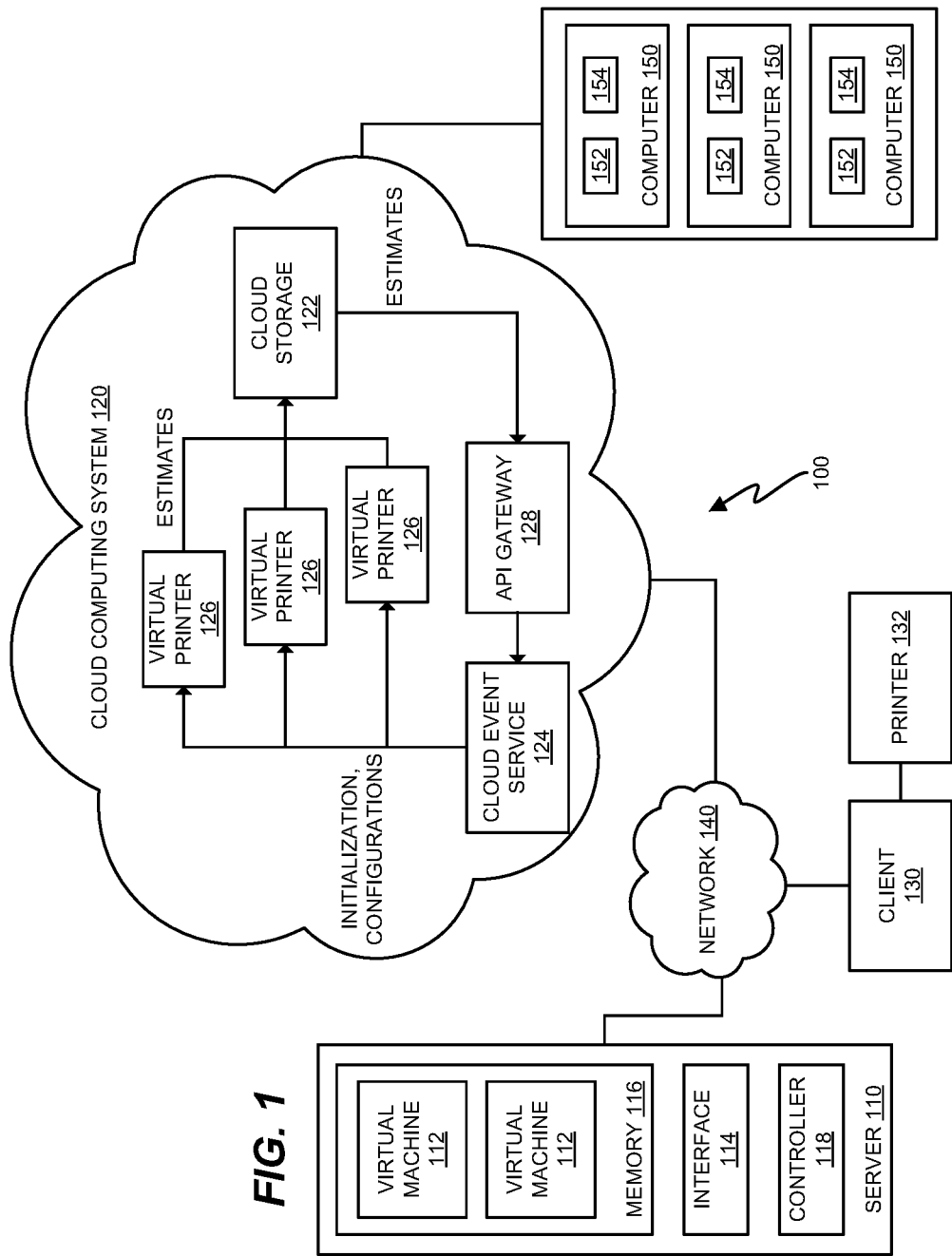
FIG. 1 is a block diagram of an ink estimation system in an illustrative embodiment.

FIG. 1 is a block diagram of an ink estimation system 100 in an illustrative embodiment. Ink estimation system 100 comprises any system, device, or component operable to perform cloud-based estimation of ink usage for one or more models of production printer. As used herein, a "cloud-based" operation is one which is performed via the operation of one or more virtual machines (or other virtual environments) that have been dynamically assigned hardware resources (e.g., processors 152, memories 154, etc.) from one or more computers 150, and are accessible via a network 140, such as the Internet or a private network. Thus, any of the components of cloud computing system 120 may be implemented via hardware resources at one or more of computers 150.

In this embodiment, ink estimation system 100 includes one or more servers 110, which may each be operated by a manufacturer of a model of printer, or by a print shop. Server 110 includes a memory 116 storing virtual machines 112 (or images thereof for use by cloud computing system 120). Each virtual machine 112 represents a series of printer, a model of printer, or a specific printer. Each virtual machine 112 at the server 110 is designed to simulate the hardware resources (e.g., memory, processor, etc.) and software resources (e.g., installed firmware, Operating System (OS), software, etc.) implemented by a corresponding series, model, or specific printer. In one embodiment, the software resources include instructions for rasterization of print data, as well as instructions for operating an ink estimation model that estimates ink usage for print jobs based on the results of rasterization.

Server 110 also includes a controller 118 for updating the virtual machines 112 in response to new ink usage data. Controller 118 may be implemented as custom circuitry, as a hardware processor executing programmed instructions, etc. An interface 114 of server 110 provides the virtual machines 112 to cloud computing system 120 (e.g., a cloud storage 122 of cloud computing system 120). A virtual machine 112 may then be utilized by the cloud computing system 120 in order to instantiate multiple virtual printers 126.

During operation, a client 130 may submit a print job intended for printing at a printer 132 to cloud computing system 120, in order to estimate an amount of ink that will be used printing the job. The print job may comprise Page Description Language (PDL) print data, such as Portable Document Format (PDF) print data, accompanied by a job ticket. The print job is submitted via network 140, such as the Internet or a private network.

In this embodiment, the print job is submitted to an Application Programming Interface (API) gateway 128, which operates as an interface for receiving the print job from a browser of the client 130. The API gateway 128 pushes an event notification to cloud event service 124, which instantiates a number of virtual printers 126 equal to the number of configurations to be considered for printing the print job.

The virtual printers 126 each emulate the series, model, or specific printer intended for printing the print job. In one embodiment, each virtual printer 126 comprises a copy of the virtual machine 112 which represents the printer 132 that will be printing (or its corresponding model or series). However, each virtual printer 126 has been tailored to a specific, different configuration for the printer 132, in that software settings or hardware settings are adjusted at each virtual printer 126 to match a specific configuration. The virtual printers 126, which are each initialized according to a different configuration, perform ink estimation for the print job based on their configurations. These configurations may be provided with the print job by the client 130, may be dynamically determined, or may constitute a default array of configurations for a specific series of printer, or model of printer, printer, or client.

As used herein, a configuration of a printer comprises any setting for a printer which alters printed output for the print job. In a brief example, configurations may include paper weights, paper coatings, paper smoothness, paper ink absorptions, n-up printing settings, control mark settings, color curves, and intensity settings for a printer.

In further embodiments, configurations may include any settings that affect ink estimation. These include paper settings such as page width or length, paper weight, paper thickness, paper type, paper color, whether preprinted registration marks are included within the paper, whether the paper is perforated, whether the paper is coated (e.g., including the type of coating), whether the paper is preprinted, an opacity of the paper, or even advance settings such as printing speed, distance, and/or tension.

Further printer configurations may include flushing settings such as flushing type and page flushing settings, calibration settings such as calibration status and calibration data, etc.

Still further printer configurations may include job settings, including basic settings such as a number of copies, page range, selected paper, orientation, printing side, open orientation, and whether the print job is color or black and white. Other job settings include job setup settings (e.g., sample print settings, or input data format settings), layout information (e.g., whether printing is performed duplex, N-up, etc.), color settings, and image correction/enhancement settings.

Still further printer configurations may include color management settings, such as whether the printer is set to print color or black and white, spot color matching, black overprint, black/gray reproduction settings, control bar settings, color substitutions, black settings for text and/or line art, CMYK overprint settings, whether PDF/X output intent is used, etc. Some color management settings relate to print quality, such as ink limit settings, tone curves, and coordination of ink density across multiple print engines. Still further color management settings include input CMYK settings, input RGB settings, input gray settings, reference profiles, printer profiles color, printer profiles black and white, whether or not embedded CMYK profiles are used, whether or not embedded RGB profiles are used, whether or not embedded gray profiles are used, rendering intent, and other settings, such as spot colors.

Ink estimates generated by the virtual printers 126 are provided to a cloud storage 122, which may be accessed by API gateway 128, an email service, or other system for providing ink estimates to client 130. Once the ink estimates have been completed, cloud event service 124 may dynamically release resources assigned to the virtual printers 126, deleting those virtual printers 126.

Any of the various components of cloud computing system 120 may be implemented by the hardware resources available at one or more computers 150 that are capable of engaging in networked communications with each other. For example, cloud event service 124 may be implemented utilizing processors and memories of computers 150, may listen for events, may instantiate the virtual printers 126, and/or may delete the virtual printers 126 to facilitate ink estimation operations.

The particular arrangement, number, and configuration of components described herein is illustrative and non-limiting. Illustrative details of the operation of ink estimation system 100 will be discussed with regard to FIG. 2. Assume, for this embodiment, that a customer has prepared a print job intended for printing on a specific printer, but is uncertain of the amount of ink that the print job will use.

Figure 2:
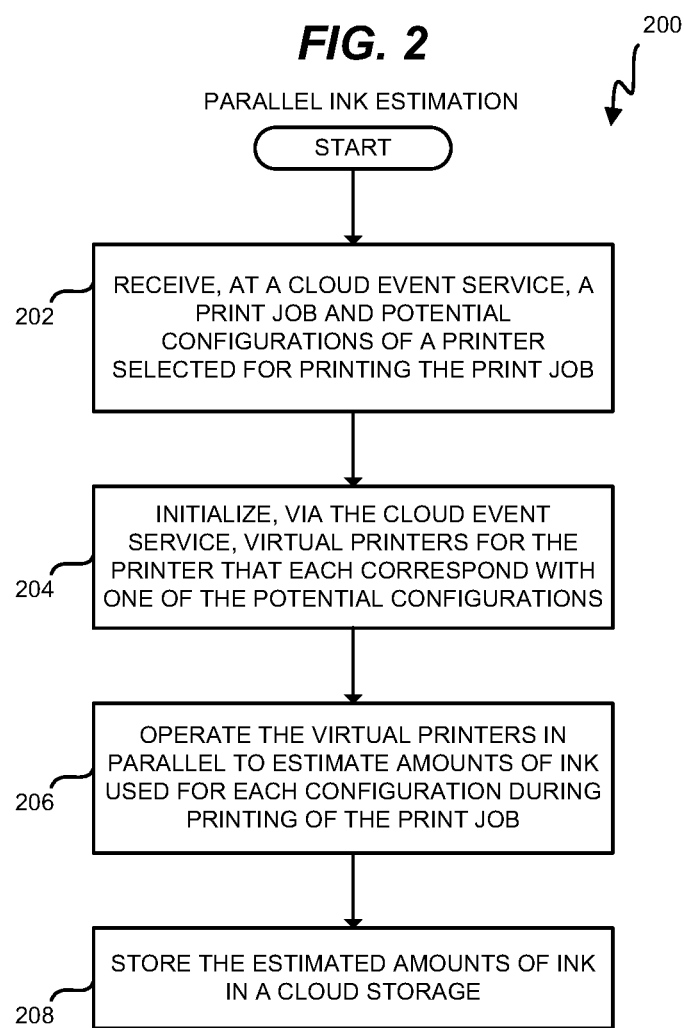
FIG. 2 is a flowchart illustrating a method for estimating ink via multiple virtual printers operating in parallel in an illustrative embodiment.

FIG. 2 is a flowchart illustrating a method 200 for estimating ink via multiple virtual printers operating in parallel in an illustrative embodiment. The steps of method 200 are described with reference to ink estimation system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, cloud event service 124 receives a print job and potential configurations of a printer 132 selected for printing the print job. In this embodiment, the print job is transmitted via client 130, and the potential configurations are reported by client 130, or stored by default in a cloud storage 122 and associated with the printer, its model, its series, or its client. The potential configurations are distinct from each other, and may alter the manner in which ink droplets are ejected onto the page (e.g., by altering a size or density of ink droplets). Thus, the amount of ink utilized by the printer 132 in each configuration is likely to vary.

Step 204 includes the cloud event service 124 initializing virtual printers 126 for the printer 132 that each correspond with one of the potential configurations. Although all of the virtual printers 126 may be initialized from the same virtual machine 112 corresponding with the printer 132, one virtual printer 126 is initialized for each potential configuration of that printer 132. Thus, in one embodiment, each of the virtual printers 126 represents the same model of printer, and each of the virtual printers 126 estimates an amount of ink used by a different configuration of that model of printer.

Initializing the virtual printers 126 may comprise assigning resources for a virtual machine 112 corresponding with the printer 132 being considered, and executing instructions to boot an OS of the virtual machine 112, along with any corresponding software for emulating the printer 132. For example, initializing a virtual printer 126 may include launching software defining an ink estimation model for the printer 132 that virtual printer 126 represents. In one embodiment, each virtual printer 126 comprises a Digital Front End (DFE) corresponding to the printer 132 selected for printing the print job.

Step 206 includes operating the virtual printers 126 in parallel to estimate amounts of ink used for each configuration during printing of the print job. As a part of this process, each virtual printer 126 may independently and/or asynchronously rasterize print data for the print job, interpret job ticket instructions, apply settings for the configuration assigned to the virtual printer, and estimate ink used for the print job based on the assigned configuration. Thus, in at least one embodiment, each of the virtual printers 126 is configured to estimate an amount of ink usage based on a rasterization of the print job.

Step 208 includes storing the estimated amounts of ink in a cloud storage 122. In one embodiment, each virtual printer 126 stores a corresponding estimated amount within the cloud storage 122, such as within a shared folder or file. In a further embodiment, cloud event service 124 stores each estimated amount in response to receiving a confirmation form a virtual printer 126 that the virtual printer 126 has completed ink estimation.

After the estimated amounts have been placed into cloud storage 122, the estimated amounts may be accessed by other services or components that interact with cloud computing system 120. For example, an email server, text messaging service, or other entity may access the estimated amounts and report them to a computing device such as client 130.

Method 200 provides a notable advantage over prior systems and techniques, because it enables rapid, massively parallel processing of print jobs in order to estimate ink usage. This allows for multiple configurations to be contemplated at once for each print job. Providing an enhanced breadth of ink estimation for multiple possible configurations helps a print shop operator to intelligently choose a configuration for printing the print job.

In a further embodiment, a virtual machine 112 for the virtual printers 126 is configured to be updated based on a comparison of an actual amount of ink used to the estimated amounts of ink used. For example, a virtual machine 112 for the virtual printers 126 may receive updated training data for an ink estimation model that utilizes machine learning. The ink estimation model may then be re-trained with the updated training data to enhance accuracy. Further discussion of such a system is provided below with respect to FIGS. 8-10.

Figure 3:
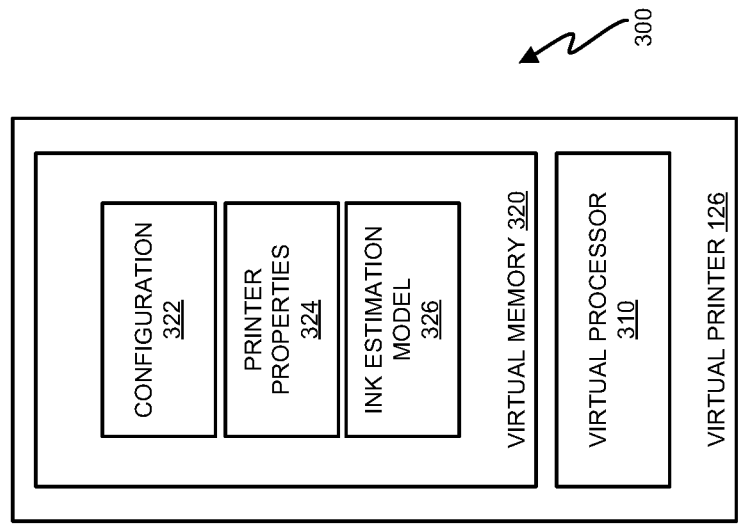
FIG. 3 is a block diagram of a virtual printer in an illustrative embodiment.

FIG. 3 is a block diagram 300 of a virtual printer 126 in an illustrative embodiment. In this embodiment, virtual printer 126 includes a virtual processor 310 and a virtual memory 320, which comprise allocated resources at one or more processors and/or memories of computers 150 of FIG. 1. Virtual memory 320 includes a configuration 322, a set of printer properties 324 assigned to the virtual printer 126, and an ink estimation model 326. The configuration 322 may be implemented at virtual printer 126 as instructions for altering or adjusting input to the ink estimation model 326, based on requested settings. In this embodiment, printer properties 324 include information identifying a series, model, and/or identifier for the printer 132 being emulated by the virtual printer 126. Printer properties 324 may also include information describing a virtual machine 112 that the virtual printer 126 was implemented on, and/or other properties.

Ink estimation model 326 may implement any suitably accurate heuristic for estimating an amount of ink used by a printer in printing a print job. For example, an ink estimation model may comprise a series of weights applied to input variables such as estimated ink amounts or metrics for rasterized print data (e.g., an amount of ink coverage per page). In many embodiments, ink estimation model 326 estimates an amount of used for each of multiple color planes, such as Cyan, Magenta, Yellow, and Key black (CMYK). The ink estimation model 326 may comprise a static model, or a machine learning model as desired. For example, the ink estimation model 326 may comprise a regression model, a neural network, or other model that utilizes machine learning to estimate ink usage based on a number and/or size of dots ejected onto a page by print nozzles, or an amount of coverage of the page with ink. In one embodiment, the ink estimation model 326 utilizes training data in order to adjust weights between nodes of a neural network that estimate ink usage based on rasterized print data. In such an embodiment, the ink estimation model 326 may be updated or re-trained based on information indicating the actual amount of ink used for each print job, as well as information indicating metrics for corresponding rasterized print data.

Figure 4:
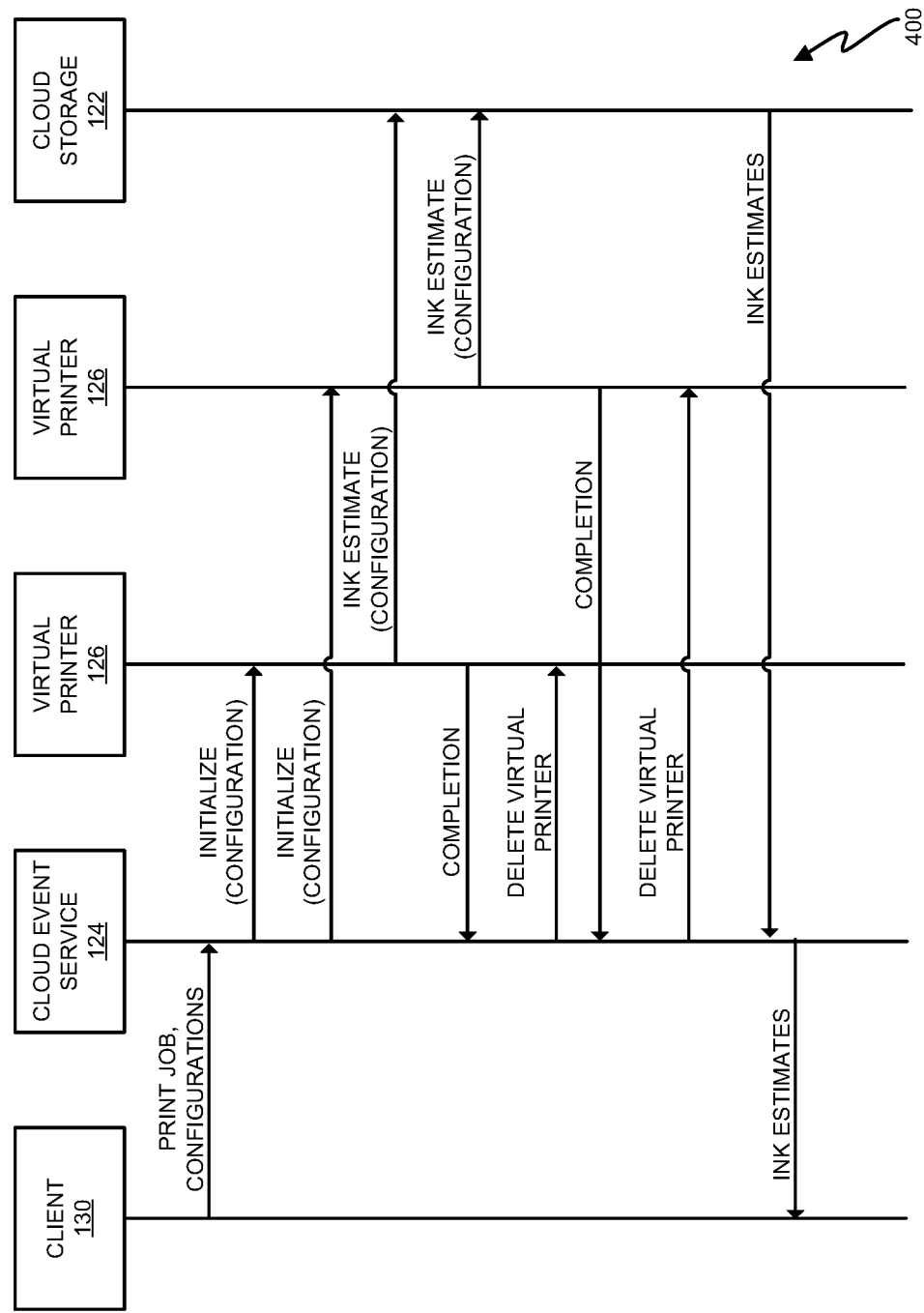
FIG. 4 is a message diagram depicting communications between various components of an ink estimation system in an illustrative embodiment.

FIG. 4 is a message diagram 400 depicting communications between various components of an ink estimation system 100 in an illustrative embodiment. As shown in FIG. 4, one or more clients 130 provide a print job and set of configurations for a printer 132 to cloud event service 124. The cloud event service 124 initializes a virtual printer 126 for each configuration of the printer 132, and these virtual printers 126 generate ink estimates. The ink estimates are stored in a cloud storage 122, and cloud event service 124 receives a completion notification from a virtual printer 126 each time an ink estimate is completed. In this embodiment, cloud event service 124 deletes each of the virtual printers 126 after receiving confirmation that an ink estimate has been completed. The cloud event service 124 then retrieves ink estimates from the cloud storage 122, and provides the ink estimates to client 130, such as via an API for access by a browser of the client 130.

Figure 5:
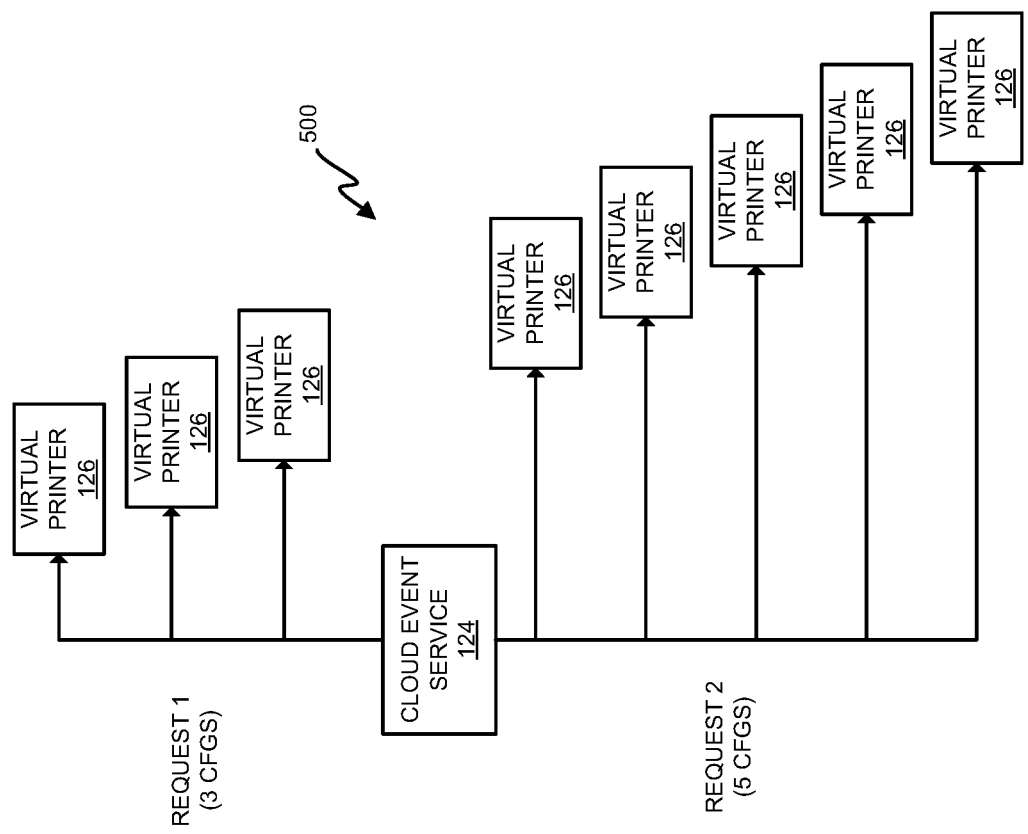
FIG. 5 is a block diagram of a cloud event service that operates multiple sets of virtual printers in order to estimate ink for multiple print jobs in parallel in an illustrative embodiment.

FIG. 5 is a block diagram 500 of a cloud event service 124 that operates multiple sets of virtual printers 126 in order to estimate ink for multiple print jobs in parallel in an illustrative embodiment. In this embodiment, each time the cloud event service 124 receives a print job and a set of configurations, for any printer 132 at any client 130, the cloud event service 124 instantiates a set of virtual printers 126, including one virtual printer 126 for each potential configuration of the printer being considered. This may be performed as a parallel process. Hence, the existence of a set of virtual printers 126 to estimate ink for a first print job for a printer does not prevent cloud event service 124 from instantiating another set of virtual printers for another print job of the same or another printer.

Figure 6:
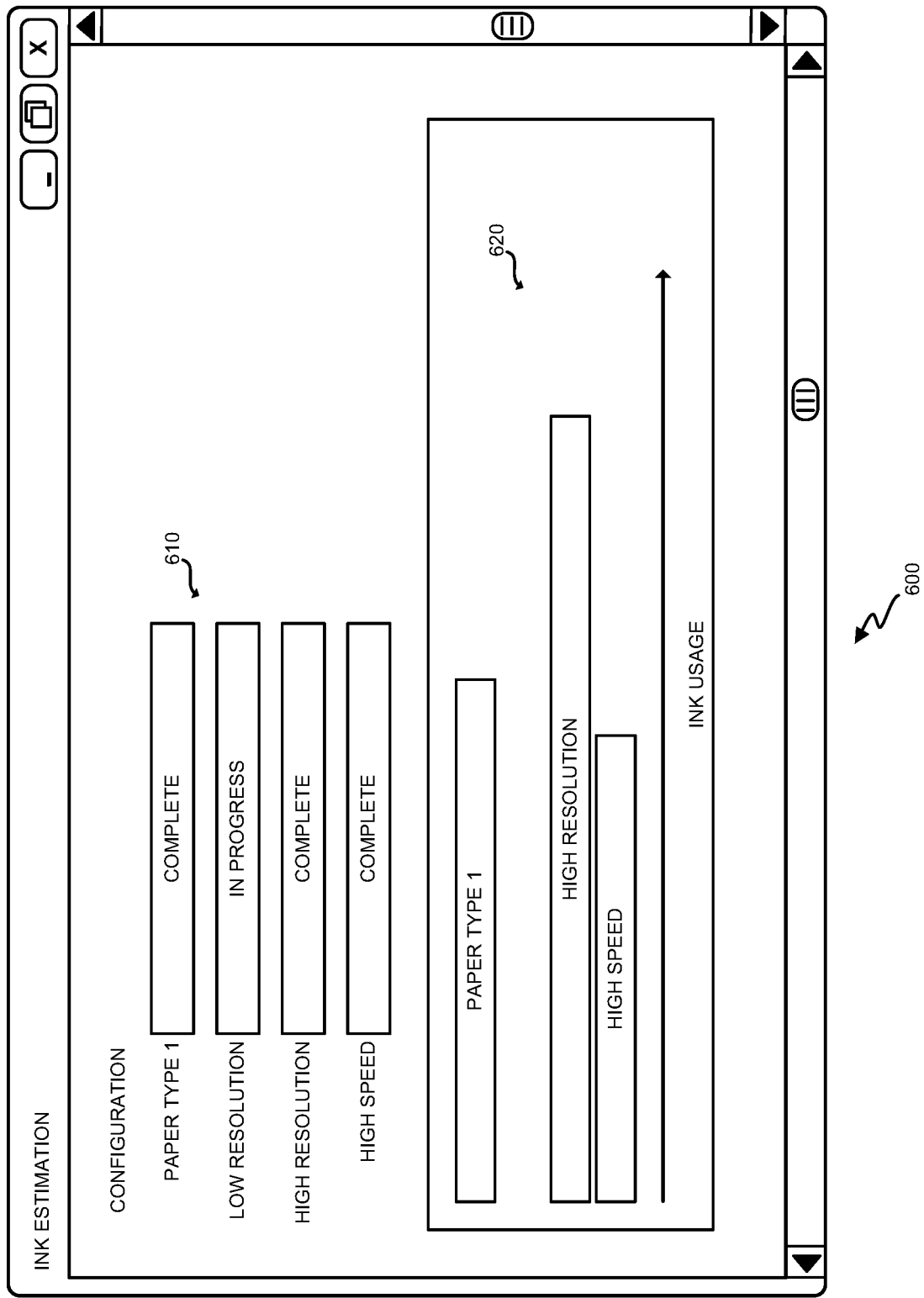
FIG. 6 depicts a Graphical User Interface (GUI) for reporting estimates of ink usage for a print job in an illustrative embodiment.

FIG. 6 depicts a Graphical User Interface (GUI) 600 for reporting estimates of ink usage for a print job in an illustrative embodiment. In this embodiment, GUI 600 comprises a browser window that includes a first area 610 indicating the progress of one or more ink estimates for a print job for a printer. The first area 610 is updated in response to notifications via an API gateway indicating that an ink estimate has been completed for a corresponding configuration. Thus, the first area may be filled with estimates, one by one, over time. This allows a print shop operator to review the estimates which have been completed, even when other estimates still need more time. A second area 620 of the GUI 600 provides a graphical representation of a set of ink estimates for a print job. Each estimate is labeled with a corresponding configuration. In this manner, a print shop operator may rapidly review and compare ink estimation results for a variety of different configurations for the printer.

Figure 7:
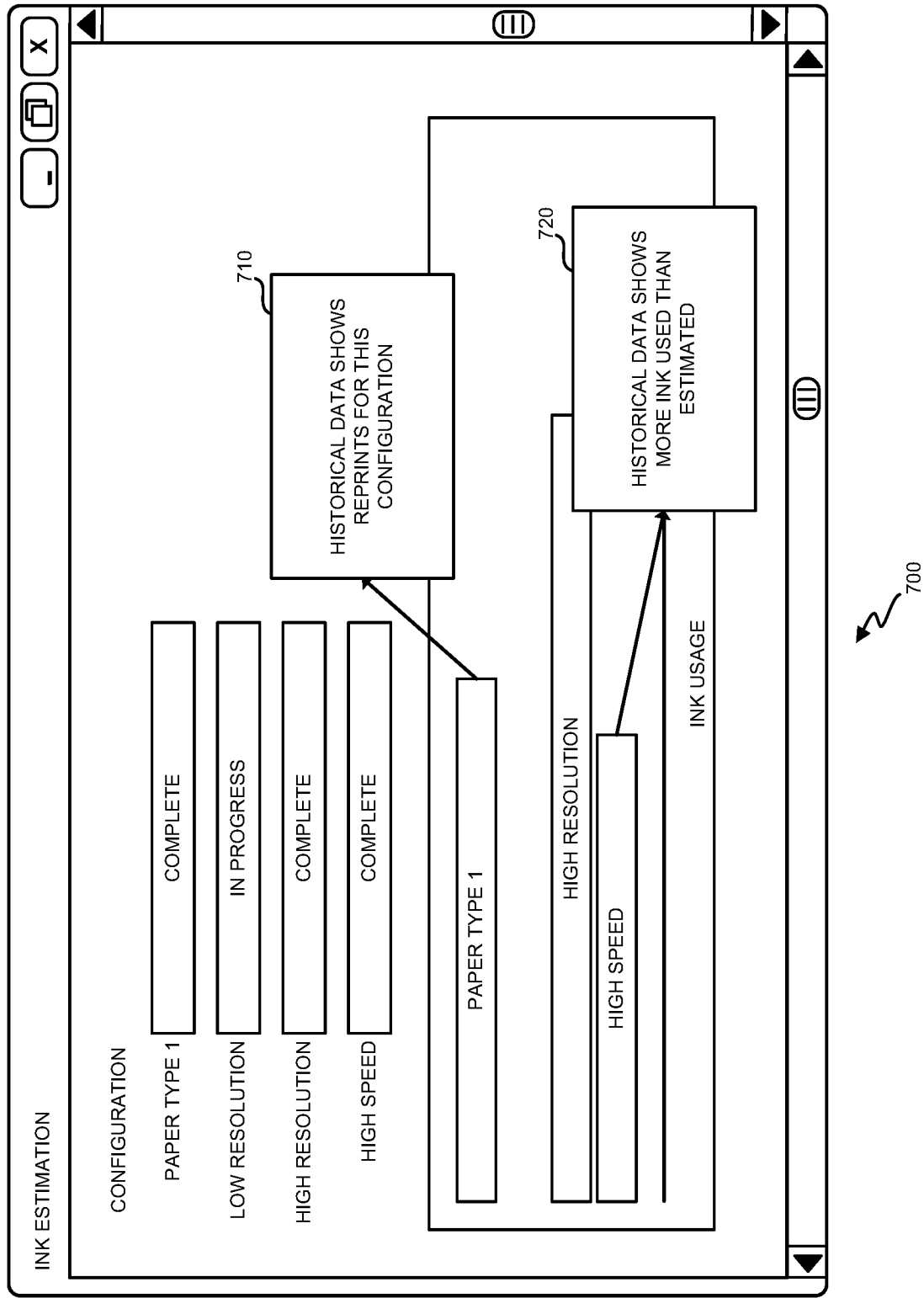
FIG. 7 depicts a GUI that includes warnings based on prior feedback for settings in an illustrative embodiment.

FIG. 7 depicts a GUI 700 that includes warnings based on prior feedback for settings in an illustrative embodiment. In this embodiment, GUI 700 comprises GUI 600, in addition to multiple notifications that are tied to specific configurations. Specifically, GUI 700 utilizes data from a cloud storage 122 that holds feedback for various configurations for the printer being considered. This feedback may be created in response to explicit communications from a client 130, or may be generated automatically in response to detecting a threshold difference in actual ink usage as compared to estimated ink usage, or based on historical data indicating that a print job was printed more than once, indicating a re-print. In one embodiment, a first piece of text feedback is provided for more than a threshold difference in ink usage, while a second piece of text feedback is provided for re-prints.

GUI 700 accesses feedback for each configuration of the printer kept in cloud storage 122, and proceeds to provide the feedback in the form of notifications. In FIG. 700, notifications 710 and 720 are provided. These notifications may be provided in response to a user hovering over or clicking on a corresponding configuration. Notification 710 indicates that print jobs using the configuration have been historically subject to re-prints, while notification 720 indicates that estimates of ink usage for the corresponding configuration are often less than the actual amount of ink used during printing.

With a discussion of cloud computing operations for performing parallel ink estimation provided above with respect to FIGS. 3-7, FIGS. 8-10 provide further context for utilizing ink estimation data to fuel adjustments to an ink estimation model for a virtual machine representing a printer, model of printer, or series of printer.

Figure 8:
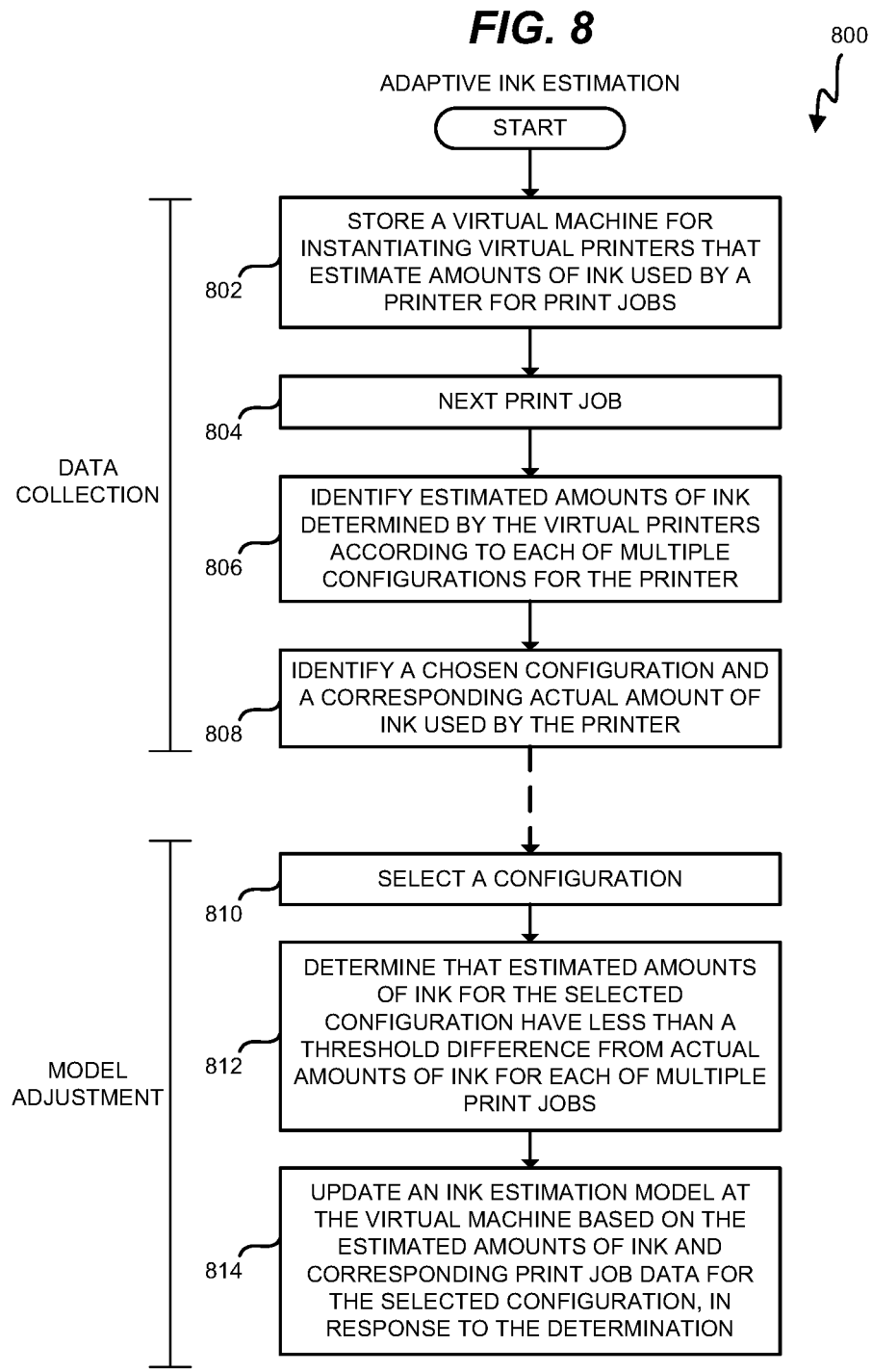
FIG. 8 is a flowchart illustrating a method for altering ink estimation models based on a comparison of estimated to actual ink usage in an illustrative embodiment.

FIG. 8 is a flowchart illustrating a method 800 for altering ink estimation models based on a comparison of estimated to actual ink usage in an illustrative embodiment. Steps 802-808 relate to data collection processes for receiving and collecting ink estimates, while steps 810-814 relate to adjusting an ink estimation model based on collected ink estimates. Data collection processes and ink estimation model adjustments may be performed asynchronously and/or in parallel as desired, for each of multiple virtual machines representing different printers, models of printer, or series of printer.

Steps 802-808 may be performed periodically to analyze batches of completed print jobs, each time a print job is completed, or in any other sequence desired. Furthermore, steps 802-808 may be performed asynchronously and/or in parallel for each of multiple virtual machines 112.

Step 802 includes controller 118 storing a virtual machine 112 for instantiating virtual printers 126 that estimate amounts of ink used by a printer 132 for print jobs. Storing the virtual machine 112 may comprise loading or maintaining the virtual machine 112 in memory 116 for access by a cloud computing system 120. The virtual machine 112 may represent a single printer 132, a model of printer, or a series of printer as desired. In many embodiments, virtual machine 112 is one of many virtual machines 112 that each represent a different printer, model, or series. In a further embodiment, a virtual machine 112 may be one of a set of virtual machines 112 for a client 130, such that each client 130 has an associated set of one or more virtual machines 112 representing printers 132 used by that client 130.

Step 804 comprises controller 118 identifying a next print job. In one embodiment, this is performed as part of batch processing of ink estimate data for each of multiple virtual machines 112. In a further embodiment, step 804 is performed as each print job is completed, in response to a push notification from cloud event service 124 that a print job was completed relating to virtual machine 112. As a part of this process, controller 118 may access a cloud storage 122 to review data for a list of print jobs having completed ink estimates.

Step 806 comprises controller 118 identifying estimated amounts of ink determined by the virtual printers 126 according to each of multiple configurations for the printer 132 for the print job. This may comprise controller 118 accessing a cloud storage 122 (e.g., after virtual printers 126 have completed estimates for the print job) in order to retrieve the estimated amounts of ink for analysis and review. In one embodiment, controller 118 additionally retrieves metrics for corresponding rasterized print data, which may be used later to facilitate training or adjustment of an ink estimation model.

Step 808 comprises controller 118 identifying a chosen configuration and corresponding actual amount of ink used by the printer for the print job. The chosen configuration is the configuration that was used by the printer 132 to print the print job. Step 808 may be performed, for example based on ink usage data provided from printer 132 (e.g., via client 130) to server 110 or to a cloud storage 122. In one embodiment, this is performed in response to receiving input from printer 132 at API gateway 128, indicating the actual amount of ink used for print jobs printed by printer 132, or aggregating such results across multiple print jobs, multiple printers, or multiple models of printers. In further embodiments, controller 118 actively identifies the actual amount of ink by querying the printer 132.

After a predetermined period of time, or after a certain amount of data has been collected, or in response to user input, controller 118 may transition from data collection to adjustment of the underlying ink estimation model for the virtual machine 112. To this end, step 810 comprises identifying a configuration. This may comprise controller 118 reviewing one of many configurations used for print jobs over a period of time (e.g., the last day, week, month, etc.) by the virtual machine 112, reviewing default sets of configurations used for the virtual machine 112, etc.

Step 812 comprises determining that estimated amounts of ink for the selected configuration have less than a threshold difference from actual amounts of ink for each of multiple print jobs. The actual amount of ink used for a print job may be compared to the estimated amount for that print job by, for example, determining a mathematical difference between the two. This difference may be reported as a percentage difference, or as an absolute difference. Controller 118 may perform this operation by subtracting the estimated amount of ink from the actual amount of ink, determining the absolute value of the resulting number, and determining whether the amount is greater than or less than the threshold value (e.g., ten milliliters of ink, etc.).

In some embodiments, the threshold value is a percentage difference from the estimated value. Thus, if the actual amount of ink used for a print job is different from the estimated amount of ink by less than this percentage (e.g., ten percent, twenty percent), then the estimate may be considered accurate. In one embodiment, the controller 118 is further configured to determine whether the difference is less than the threshold for each of multiple color planes, and may update the ink estimate model for each of multiple color planes in order to accurately estimate ink consumption for Cyan, Magenta, Yellow, and Key black (CMYK).

Step 814 includes updating an ink estimation model 326 at the virtual machine 112 based on the estimated amounts of ink and corresponding print job data (e.g., metrics for rasterized print job data) for the configuration, in response to the determining performed in step 812. Updating the ink estimation model 326 ensures that future estimates will be more accurate than current estimates. In one embodiment, controller 118 updates the ink estimation model 326 by adjusting weights of the ink estimation model 326 based on the difference between estimated and actual usage, together with metrics for rasterized print data (e.g., information indicating ink coverage on the page, etc.). Depending on embodiment, the ink estimation model 326 may be updated for the specific printer, a specific client 130 or print shop, a model of printers, or a series of printers as desired.

Method 800 provides a technical benefit by ensuring that ink estimation models 326 remain up to date and accurate for specific printers, models of printer, or series of printer. Furthermore, method 800, by utilizing estimates of ink usage to populate training data, ensures that a robust amount of training data remains available for training its models.

In a further embodiment, the ink estimation model 326 utilizes machine learning (e.g., a regression model, neural network, or other learning model) and is updated by controller 118 updating corresponding training data with estimated amounts of ink, and metrics for rasterized print data for corresponding print jobs. In one embodiment, this comprises adding a new point of data for each print job that was printed. In further embodiments, this comprises applying a "delta" or other value indication of a difference between estimated and actual amounts of ink usage. This may further comprise re-training the ink estimation model 326, or otherwise adjusting weights for the ink estimation model 326 to reduce differences between estimated and actual amounts of ink used. In this manner, controller 118 may replace or supplement the training data with the estimated amounts of ink discussed above, and may then retrain the ink estimation model 326 as desired.

In one embodiment, the ink estimate model comprises a neural network. An upper layer of the neural network includes nodes that receive inputs comprising, amounts of dots for each of multiple color planes, and configuration data for the printer. A bottom layer of the neural network provides output indicating a volume of ink used per color plane.

In further embodiments, controller 118 is capable of rapidly identifying that estimates for print jobs have lost their accuracy. For example, if estimates for a configuration for a printer have been historically within a threshold level of accuracy (e.g., ninety percent accurate), and recent estimates for the configuration are not within the threshold, controller 118 may generate a notification for client 130. The notification may ask whether the printer 132 has experienced an equipment failure, or whether operating conditions for the print have been altered. This may help to rapidly notify a print shop operator that printer 132 has deviated from its historical amounts of ink usage, enabling remedial measures to be taken quickly.

Figure 9:
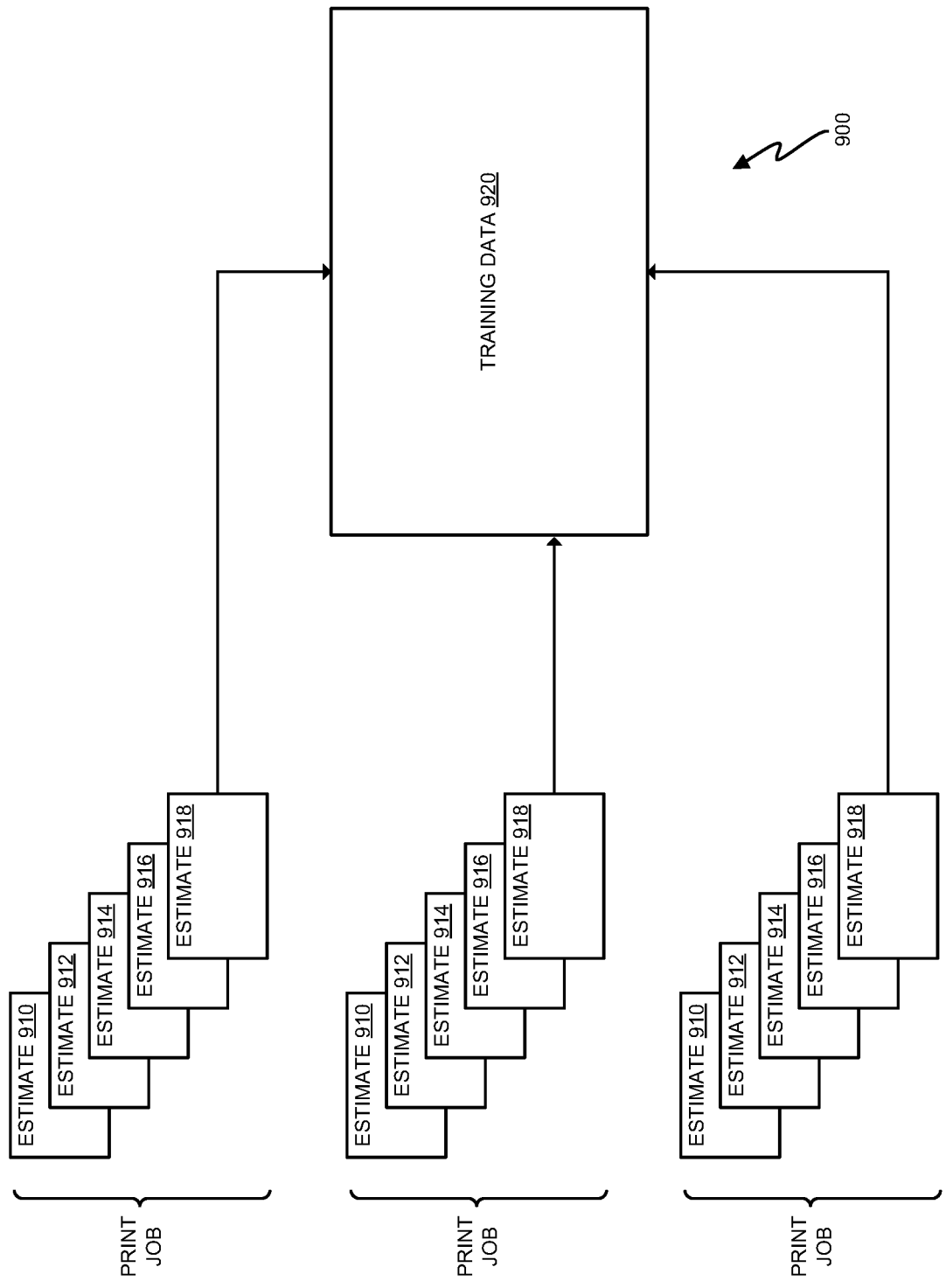
FIG. 9 is a diagram for including estimates for a specific configuration within training data for an ink estimation model in an illustrative embodiment.

FIG. 9 is a diagram 900 for including estimates for a specific configuration within training data for an ink estimation model in an illustrative embodiment. In this embodiment, for each print job for a printer 132, a set of estimates 910-918 of ink usage are created. Estimate 910 corresponds to a first configuration, estimate 912 corresponds to a second configuration, estimate 914 corresponds to a third configuration, estimate 916 corresponds to a fourth configuration, and estimate 918 corresponds to a fifth configuration. These estimates 910-918 may be selectively provided to training data 920, which is used to update an ink estimation model. In this embodiment, controller 118 determines that estimates 918 for the fifth configuration are consistently within a threshold level of accuracy for multiple print jobs. Thus, controller 118 feeds estimates 918 for the fifth configuration for each print job into the training data 920 (e.g., together with metrics for corresponding print data), to facilitate updating the ink estimation model.

In short, controller 118 may be configured to update the ink estimation model 326 with estimated amounts of ink, even when configurations for those estimated amounts were not actually chosen for printing. Controller 118 also updates the model with actual amounts of ink used. That is, when actual amounts of ink used are available for a configuration, those amounts are used. However, when only estimated amounts of ink are available, those are provided for consideration in updating the ink estimation model 326.

Figure 10:
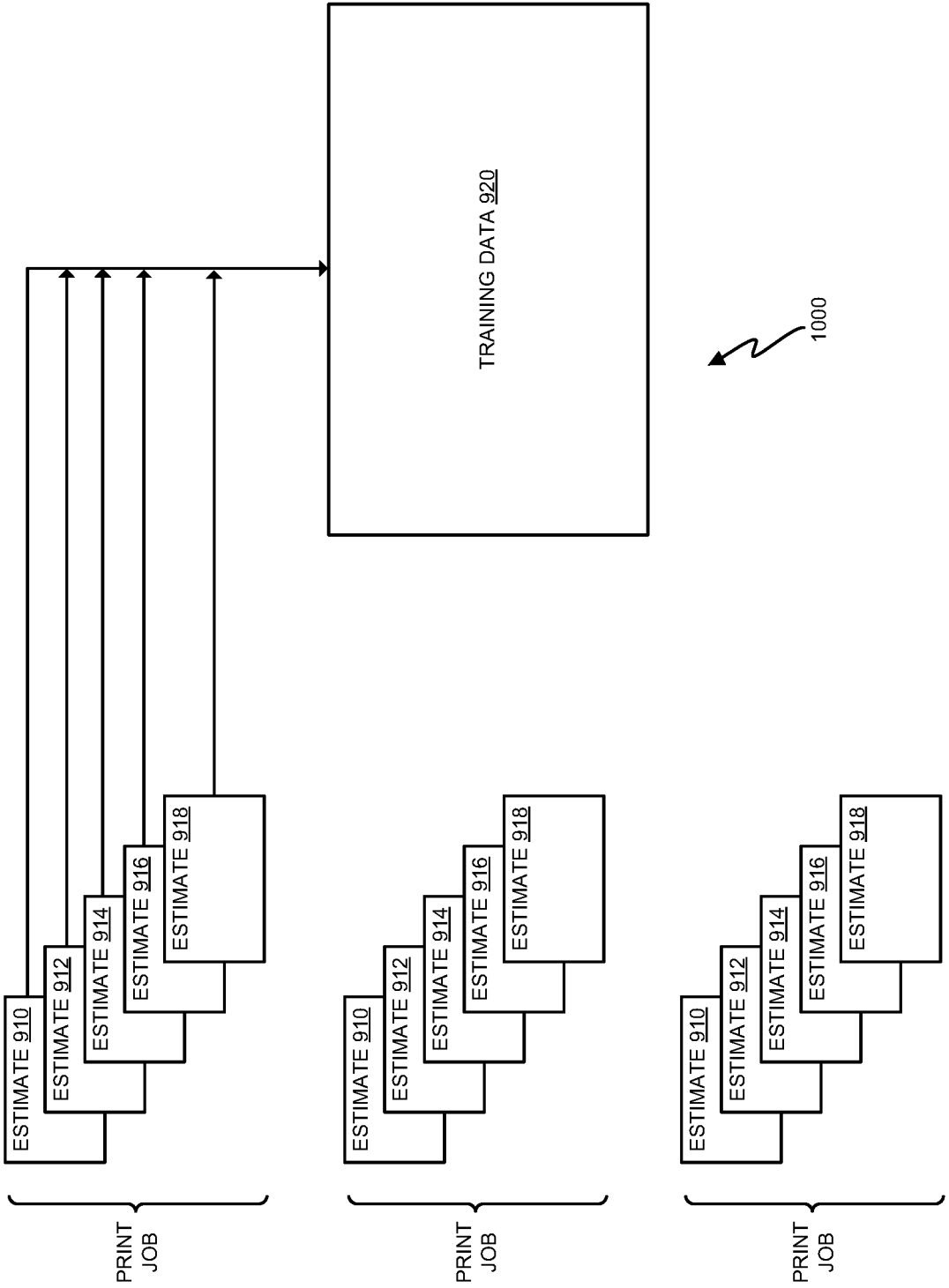
FIG. 10 is a diagram for including estimates for a specific configuration within training data for an ink estimation model in an illustrative embodiment.

FIG. 10 is a diagram 1000 for including estimates for a specific print job within training data for an ink estimation model in an illustrative embodiment. Diagram 1000 is largely similar to FIG. 9. However, in this embodiment, controller 118 determines that because an estimate 918 for configuration for a print job is highly accurate when compared to actual amounts of ink used by the printer for the print job, all estimates for all configurations for that print job shall be added to the training data 920.

In short, the controller 118 may determine that an estimated amount of ink for a configuration is within a threshold amount of accuracy (e.g., ninety five percent). Controller 118 may then update an ink estimation model at the virtual machine 112, based on other estimated amounts of ink for the print job, even when those configurations were not used for printing. Stated another way, if an estimate for one configuration is notably accurate for a print job, controller 118 may update the ink estimation model with estimates for other configurations for that print job, even when there are no corresponding actual amounts of ink usage for those estimates.

EXAMPLES

In the following examples, additional processes, systems, and methods are described. The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Figure 11:
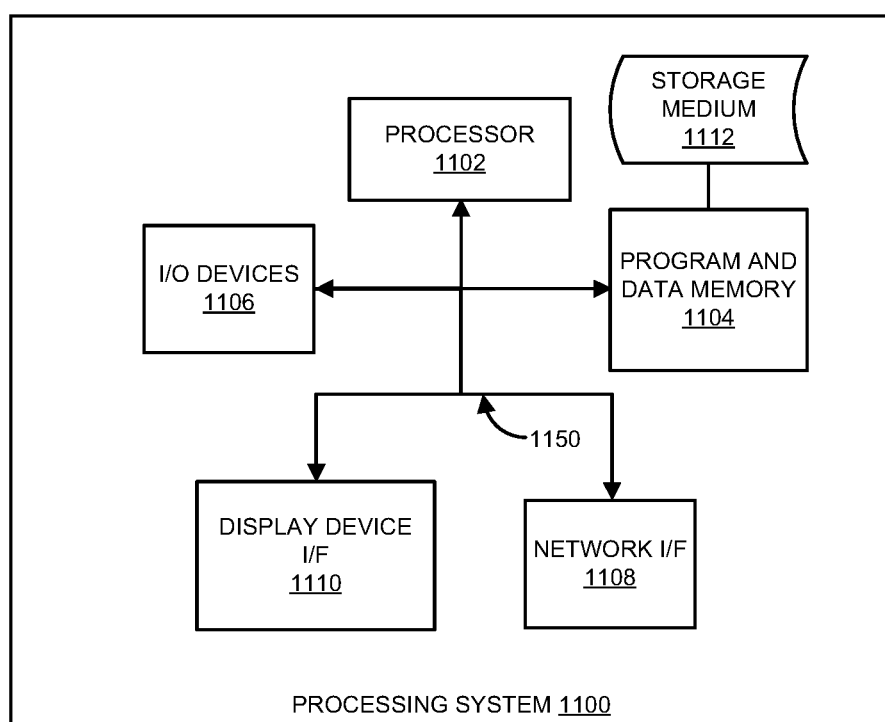
FIG. 11 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of ink estimation system 100 to perform the various operations disclosed herein. FIG. 11 illustrates a processing system 1100 operable to execute a computer readable medium embodying programmed instructions to perform desired functions in an illustrative embodiment. Processing system 1100 is operable to perform the above operations by executing programmed instructions tangibly embodied on computer readable storage medium 1112. In this regard, embodiments of the invention can take the form of a computer program accessible via computer-readable medium 1112 providing program code for use by a computer or any other instruction execution system. For the purposes of this description, computer readable storage medium 1112 can be anything that can contain or store the program for use by the computer.

Computer readable storage medium 1112 can be an electronic, magnetic, optical, electromagnetic, infrared, or semiconductor device. Examples of computer readable storage medium 1112 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1100, being suitable for storing and/or executing the program code, includes at least one processor 1102 coupled to program and data memory 1104 through a system bus 1150. Program and data memory 1104 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1106 (including but not limited to keyboards, displays, pointing devices, etc.) can be coupled either directly or through intervening I/O controllers. Network adapter interfaces 1108 may also be integrated with the system to enable processing system 1100 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1110 may be integrated with the system to interface to one or more display devices, such as printing systems and screens for presentation of data generated by processor 1102.

Although specific embodiments were described herein, the scope of the invention is not limited to those specific embodiments. The scope of the invention is defined by the following claims and any equivalents thereof.

What is claimed is:

1. A system for dynamic ink use estimation, comprising:
a cloud-based computing system comprising:
a cloud event service configured to receive a print job and a plurality of potential configurations of a printer selected for printing the print job, and configured to initialize a plurality of virtual printers for the printer,
wherein the plurality of virtual printers is operable on the cloud-based computing system,
wherein each of the plurality of virtual printers corresponds with one of the plurality of potential configurations,
wherein the plurality of virtual printers are configured to operate in parallel on the cloud-based computing system to estimate amounts of ink used during printing of the print job for each of the plurality of potential configurations of the printer, and
wherein the cloud event service is further configured to store the estimated amounts of ink in a cloud storage on the cloud-based computing system.

2. The system of claim 1 wherein:
each of the virtual printers represents a same model of printer, and
each of the virtual printers estimates an amount of ink used by a different configuration of the model of printer.

3. The system of claim 1 further comprising:
a virtual machine for the virtual printers, configured to be updated based on a comparison of an actual amount of ink used by the printer to the estimated amounts of ink.

4. The system of claim 3 wherein:
the virtual machine for the virtual printers is configured to be updated via updated training data for an ink estimation model that utilizes machine learning.

5. The system of claim 1 wherein:
each of the virtual printers is configured to estimate an amount of ink based on a rasterization of the print job.

6. The system of claim 1 wherein:
each virtual printer comprises a Digital Front End (DFE) corresponding to the printer selected for printing the print job.

7. The system of claim 1 wherein:
the configurations are selected from the group consisting of: paper weight, paper coating, paper smoothness, paper ink absorption, n-up printing setting, control mark setting, color curves, and intensity setting.

8. A non-transitory computer readable medium embodying programmed instructions which, when executed by a processor, are operable for:
receiving, at a cloud event service, from a client computer, a print job and a plurality of potential configurations of a printer selected for printing the print job, wherein the cloud event service is operable on a cloud-based computing system;
initializing, via the cloud event service, a plurality of virtual printers, wherein each virtual printer corresponds with one of the plurality of potential configurations, wherein the plurality of virtual printers is operable on the cloud-based computing system;
operating all of the plurality of virtual printers in parallel to estimate amounts of ink used for each of the plurality of potential configurations during printing of the print job; and
storing the estimated amounts of ink in a cloud storage.

9. The non-transitory computer readable medium of claim 8 wherein:
each of the virtual printers represents a same model of printer, and
the instructions are further operable for operating each of the virtual printers to estimate an amount of ink used by a different configuration of the model of printer.

10. The non-transitory computer readable medium of claim 8 wherein the instructions are further operable for:
updating a virtual machine for the virtual printers based on a comparison of an actual amount of ink used by the printer to the estimated amounts of ink.

11. The non-transitory computer readable medium of claim 10 wherein:
updating the virtual machine is performed by updating training data for an ink estimation model that utilizes machine learning.

12. The non-transitory computer readable medium of claim 8 wherein:
estimating an amount of ink at each virtual printer is based on a rasterization of the print job.

13. The non-transitory computer readable medium of claim 8 wherein:
each virtual printer comprises a Digital Front End (DFE) corresponding to the printer selected for printing the print job.

14. The non-transitory computer readable medium of claim 8 wherein:
the configurations are selected from the group consisting of: paper weight, paper coating, paper smoothness, paper ink absorption, n-up printing setting, control mark setting, color curves, and intensity setting.

15. A method dynamic ink use estimation, comprising:
receiving, at a cloud event service, from a client computer, a print job and a plurality of potential configurations of a printer selected for printing the print job, wherein the cloud event service is operable on a cloud-based computing system;
initializing, via the cloud event service, a plurality of virtual printers, wherein each virtual printer corresponds with one of the plurality of potential configurations, wherein the plurality of virtual printers is operable on the cloud-based computing system;
operating all of the plurality of virtual printers in parallel to estimate amounts of ink used for each of the plurality of potential configurations during printing of the print job; and
storing the estimated amounts of ink in a cloud storage.

16. The method of claim 15 wherein:
each of the virtual printers represents a same model of printer, and
the method further comprises operating each of the virtual printers to estimate an amount of ink used by a different configuration of the model of printer.

17. The method of claim 15 further comprising:
updating a virtual machine for the virtual printers based on a comparison of an actual amount of ink used to the estimated amounts of ink used.

18. The method of claim 17 wherein:
updating the virtual machine is performed by updating training data for an ink estimation model that utilizes machine learning.

19. The method of claim 15 wherein:
estimating an amount of ink at each virtual printer is based on a rasterization of the print job.

20. The method of claim 15 wherein:
each virtual printer comprises a Digital Front End (DFE) corresponding to the printer selected for printing the print job.

* * * * *